M. R. PERKINS
Railroad Rail.
No. 213,132
Patented Mar. 11, 1879.
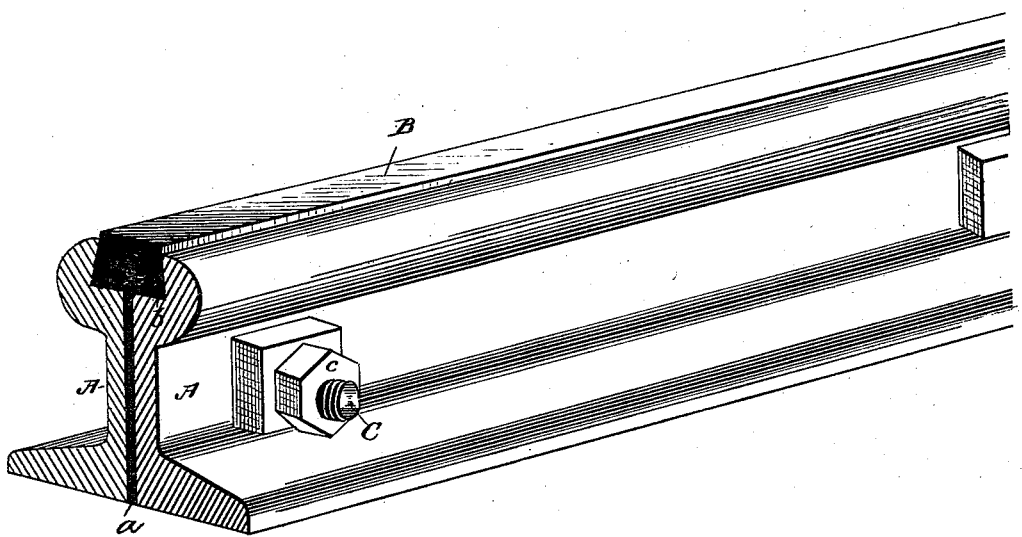
M. R. Perkins.
Inventor.

UNITED STATES PATENT OFFICE.

MICHAEL R. PERKINS, OF PORTSMOUTH, NEW HAMPSHIRE, ASSIGNOR OF ONE-HALF HIS RIGHT TO NATHAN F. MATHES, OF SAME PLACE.

IMPROVEMENT IN RAILROAD-RAILS.

Specification forming part of Letters Patent No. 213,132, dated March 11, 1879; application filed January 16, 1879.

*To all whom it may concern:*

Be it known that I, MICHAEL R. PERKINS, of Portsmouth, in the county of Rockingham and State of New Hampshire, have invented certain new and useful Improvements in Railroad-Rails; and I do hereby declare that the following is a full, clear, and exact description of my invention, which will enable others skilled in the art to which it appertains to make and use the same, reference being had to the accompanying drawing, and to letters of reference marked thereon, which form a part of this specification, and in which is represented a perspective of a sectional rail with a vulcanized-fiber or papier-maché tread.

My invention has reference to the construction of railroad-rails, and is designed especially to deaden sound; and it consists of a rail made in two pieces longitudinally, with a packing between to break the lateral concussion, and with a groove in the top, into which is fitted a bar of papier-maché or vulcanized fiber, or the like material, so as to form a tread to the rail which will deaden the sound and afford an elastic bearing-surface for the car-wheel.

In the accompanying drawing, the letter A indicates a rail made in two sections longitudinally, having a packing, *a*, of papier-maché or vulcanized fiber between the two, and with a groove, *b*, in the top face or tread of the rail. In this groove there is placed an auxiliary tread or bar, B, of papier-maché or vulcanized-fiber material, which will form a firm and yet elastic bearing-surface or tread for the car-wheels, and for that reason, as well as the other reason that it will deaden sound, is well suited for elevated railways. The packing between the two sections of the rail prevents rattling and lateral concussion. The rail being in two sections, and held together by bolts C and nuts *c*, permits of the two parts being readily separated for the purpose of removing a worn-out tread and introducing a new one in place thereof. The groove in which this tread is set is dovetailed, in order that the tread may be held more securely therein.

Having described my invention, what I claim is—

The sectional rail A, having a packing, *a*, between the sections, and provided with a vulcanized-fiber or papier-maché tread, substantially as set forth.

In testimony that I claim the foregoing as my own I affix my signature in presence of two witnesses.

MICHAEL R. PERKINS.

Witnesses:
 HOWE CALL,
 WILLIAM RUSSELL FOSTER.